July 23, 1957 J. SHEARSTONE ET AL 2,800,529

VARIABLE ATTENUATORS FOR LOW FREQUENCY ELECTRICAL CIRCUITS

Filed Feb. 10, 1953 5 Sheets-Sheet 1

Inventor
Joseph Shearstone
Thomas H. Elliott
Robin C. Dunn
By
Holcombe Wetherill & Brisebois
Attorney July 23, 1957 J. SHEARSTONE ET AL 2,800,529

VARIABLE ATTENUATORS FOR LOW FREQUENCY ELECTRICAL CIRCUITS

Filed Feb. 10, 1953 5 Sheets-Sheet 2

Inventor
Joseph Shearstone
Thomas H. Elliott
John C. Dunn
By
Holcombe Wetherill & Brisebois
Attorney.

VARIABLE ATTENUATORS FOR LOW FREQUENCY ELECTRICAL CIRCUITS

Filed Feb. 10, 1953 5 Sheets-Sheet 3

Inventor
Joseph Shearstone
Thomas H. Elliott
John C. Dunn
By
Holcombe Wetherill & Brisebois
Attorney July 23, 1957 J. SHEARSTONE ET AL 2,800,529

VARIABLE ATTENUATORS FOR LOW FREQUENCY ELECTRICAL CIRCUITS

Filed Feb. 10, 1953 5 Sheets-Sheet 4

Inventor
Joseph Shearstone
Thomas H. Elliott
John C. Dunn
By
Holcombe Wetherill & Brisebois
Attorney

VARIABLE ATTENUATORS FOR LOW FREQUENCY ELECTRICAL CIRCUITS

Filed Feb. 10, 1953

Inventor
Joseph Shearstone
Thomas H. Elliott
John C. Dunn
By
Holcombe Wetherill & Brisebois
Attorney 2,800,529

VARIABLE ATTENUATORS FOR LOW FREQUENCY ELECTRICAL CIRCUITS

Joseph Shearstone, Froggatt, and Thomas Harry Elliott and John Colin Dunn, Sheffield, England, assignors to Shearstone, Peters & Dunn Limited, Sheffield, England, a company of Great Britain Application February 10, 1953, Serial No. 336,172

Claims priority, application Great Britain February 11, 1952

26 Claims. (Cl. 179—1)

Figures 1, 2, 3, 4, 5:
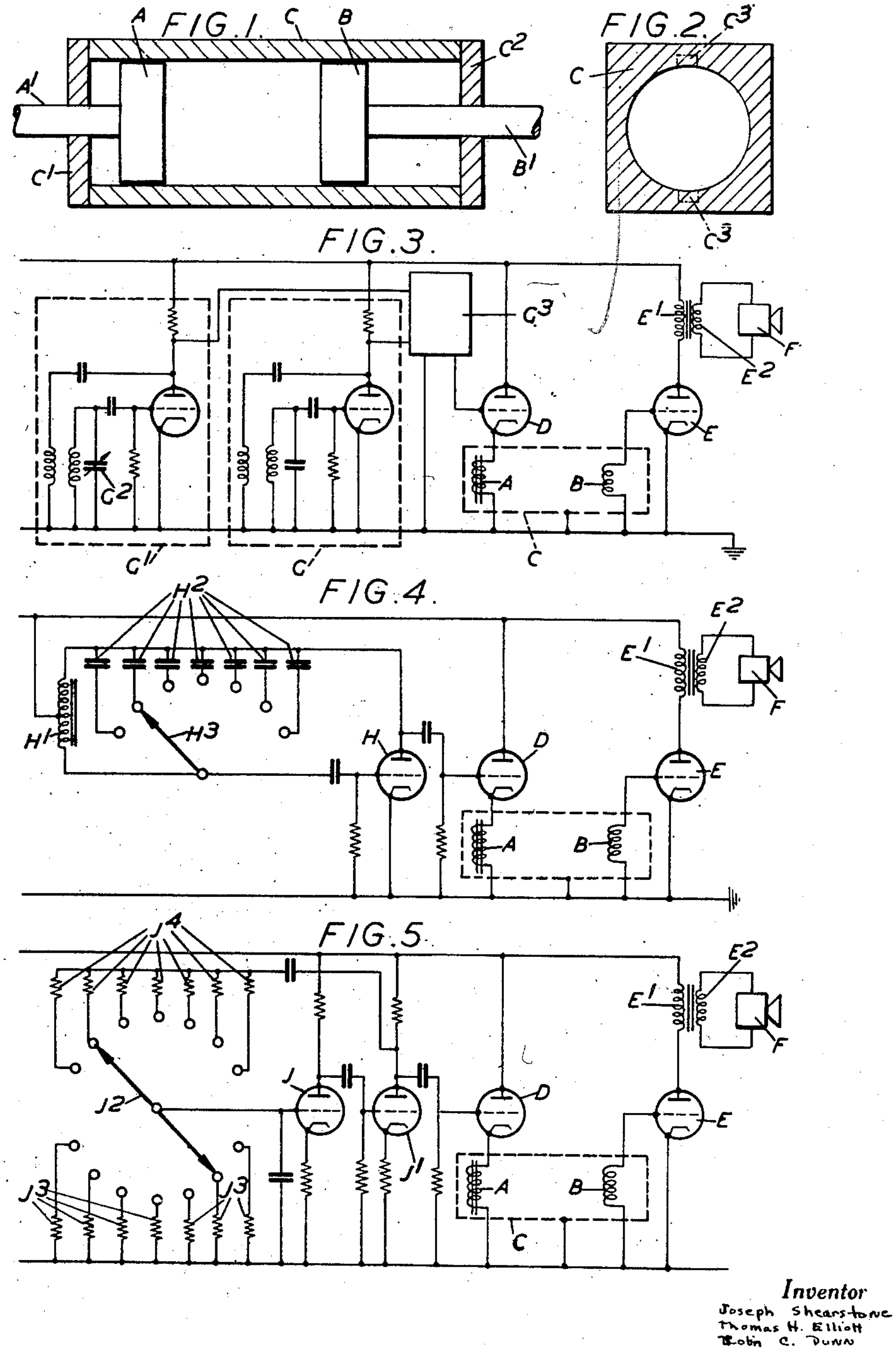

This application is a continuation-in-part of the present applicants' United States patent application Serial No. 293,852, filed June 16, 1952.

This invention relates to a variable attenuator for low frequency electrical circuits, and also to low frequency electrical apparatus incorporating such an attenuator. One example of such apparatus is an audiometer, which is an instrument for testing individual human ears and particularly the response of the ear to sounds of different frequencies. This instrument measures, in terms of a unit known as a "decibel," the intensity of the sound at each frequency which the particular ear can just hear, in comparison with the sound level just audible to the normal human ear.

In known audiometers, a variable frequency oscillator is used to generate electrical oscillations at substantially constant amplitude throughout the audible frequency range, and these oscillations are passed through a variable attenuator to an electro-acoustical transducer; usually in the form of a telephone, the sounds thus produced being applied to the ear under test. There are two practical difficulties associated with such a test. In the first place, the normal human ear responds differently to sounds of different frequencies, and secondly the transducer itself does not respond evenly to sounds of different frequencies. In one known audiometer, compensation for the varying response of both the normal ear and the transducer is afforded for each of a set of specified frequencies spaced apart throughout the frequency range, but it has not hitherto been practicable to provide such compensation for all frequencies.

It is one of the objects of the present invention to provide an improved audiometer, wherein the oscillator can be so controlled as to sweep continuously through the whole audible frequency range the desired compensation being automatically provided for every frequency throughout the range.

More generally, the primary object of the invention is to provide an improved variable attenuator, which (whilst applicable to a variety of other purposes) can be employed in an audiometer, not only to permit the intensity of the sound at any one frequency to be varied at will, but also to enable the desired compensation to be automatically given for every frequency throughout the range.

It is known in itself, in ultra-high frequency electrical circuits, concerned for example with frequencies of the order of $10^7$ cycles per second and above, to employ an attenuator of the mutual inductance type, wherein one of two coils mounted within a tube (usually of copper or brass plated with silver) is moved relatively to the other along the tube, but the known attenuators of this type are entirely useless for dealing with low frequencies within the audible range.

The variable attenuator for low frequency electrical circuits according to the present invention comprises in combination an input coil and an output coil coaxially mounted within a screening tube of magnetic material, and means whereby the axial distance between the two coils can be varied, the wall thickness of the screening tube being greater than $3.5/\sqrt{\pi f \mu \sigma}$ in metres, where $f$ is the minimum frequency of the circuit in cycles per second, $\mu$ is the magnetic permeability of the material of the screening tube in henrys per metre at the frequency $f$, and $\sigma$ is the electrical conductivity of the material of the tube in mho's per cubic metre.

The internal diameter of the screening tube is preferably not less than four times the wall thickness. The material of the tube is preferably such that the product $\mu\sigma$ is not less than 1000, when $f$ is 100. It is, however, practicable to use a material having a somewhat lower $\mu\sigma$ value, if the internal surface of the tube is interrupted for example by longitudinal grooves.

It is sometimes desirable to close at least one end of the screening tube by a disc of magnetic material, which may if desired be the same material as that used for the tube. The two coils are conveniently supported by rods or tubes, and when both ends of the tube are closed such rods or tubes will pass either respectively through the two end discs or both through one of the end discs.

Preferably, the input coil is wound on a core of magnetic material and has high reactance and low resistance and such self-capacitance that its resonant frequency lies well above the maximum frequency at which the attenuator is to be used. The output coil is preferably wound on a core of non-magnetic material.

The means for varying the axial distance between the two coils may conveniently comprise a primary operating spindle, and an actuating device operated by the spindle for effecting axial movement of one of the coils, the actuating device serving to determine the relationship between the change of output of the attenuator and the movement of the operating spindle. The actuating device may comprise a cam whose shape determines the rate of change of attenuator output relatively to the operating spindle movement, and a member operated by the cam and adjustably mounted on the rod or tube carrying the attentuator coil to be moved, the adjustment of such member on the rod or tube affording adjustment of the datum value with respect to which the output variations produced by operation of the primary spindle take place. Alternatively, or in addition, such datum value may be adjusted by adjustment of the axial position of the other attenuator coil.

For various purposes it is sometimes convenient to employ a multiple variable attenuator, comprising a group of two or more attenuator units, each arranged in the manner above described, having a single primary operating spindle common to the group and independent adjustments for the individual units. Thus, the common operating spindle may operate a set of separate actuating devices, one for each attenuator unit, and the actuating device for one unit may be different from that for another unit so as to give different rates of change of output from the units. Adjustment of such rates of change may be effected by adjustment or replacement of the actuating devices. Again, there may be individual adjustment of the datum values for the attenuator unit outputs.

A further feature of the invention relates to low frequency electrical apparatus incorporating the variable attenuator according to the invention, and in such apparatus according to this further feature, the input coil of the attenuator (or of each attenuator unit of a multiple attenuator) is energised from a low frequency source, and the output coil thereof serves, with or without amplification, to energise an output device. The input coil is preferably connected in the output circuit of an electronic valve fed from a low frequency oscillator.

The output device may take various forms, suited to the purpose for which the apparatus is used, and may consist for example of an accurate measuring device or of a transducer.

In one convenient arrangement, for use as an audiometer, the output device consists of an electro-acoustic transducer, and the oscillator is so controlled that the frequency of its oscillations can be varied whilst maintaining the amplitude of its oscillations substantially constant throughout the frequency range.

In such arrangement, the movement of one of the coils is preferably controlled in accordance with the variation of the oscillator frequency, for example by a cam driven by the frequency-control device of the oscillator, the shape of the cam being such that the variation of the attenuation caused by the coil movement affords compensation for the variable response to different frequencies of the transducer and of normal human hearing. It is sometimes desirable to provide two transducers for alternative use, and in such case the controlling cam may have two parts respectively shaped to suit the two transducers, means being provided for switching over from one transducer to the other when the cam control changes from one of its parts to the other. The other attenuator coil in such arrangement is conveniently operated to vary the intensity of the sound output from the transducer.

Figure 6:
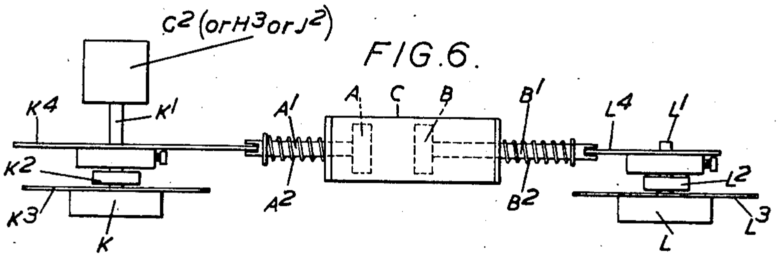
Figure 7:
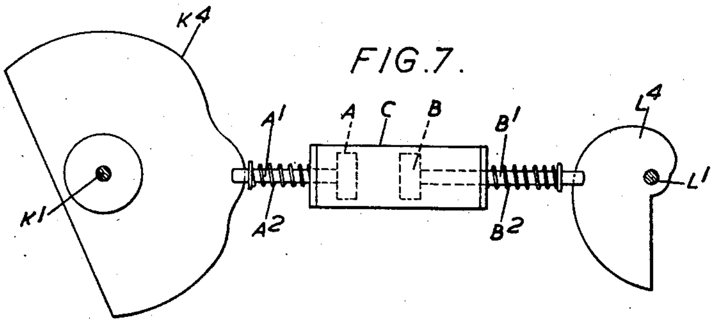
Figure 9:
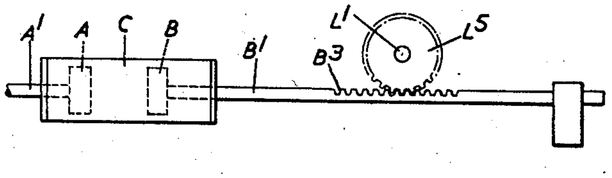
Figure 10:
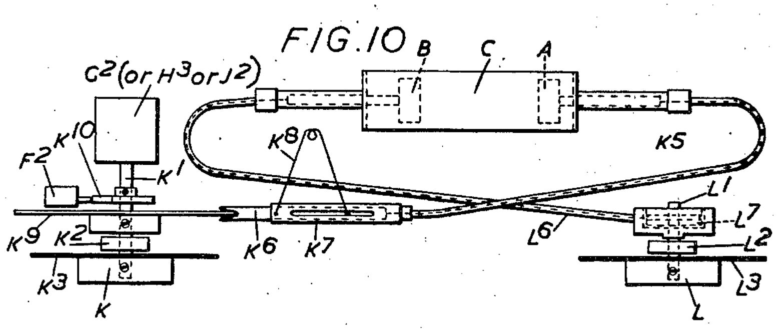
Figure 11:
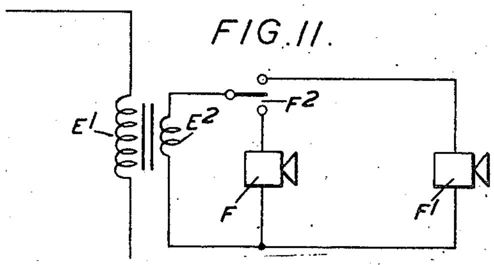
Figures 12, 13:
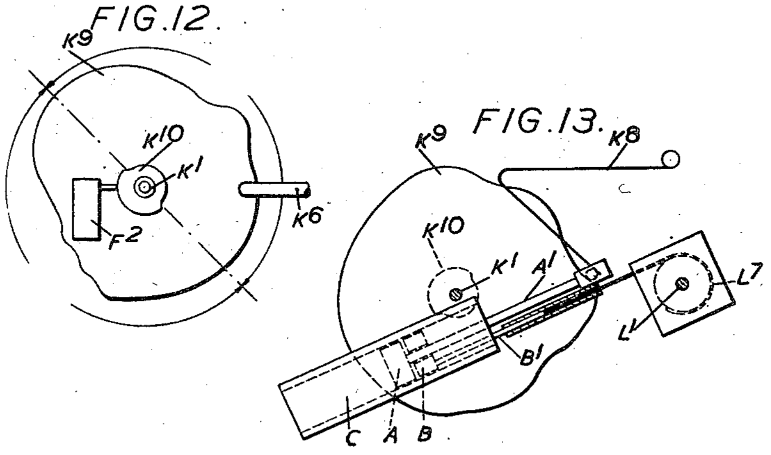
Figure 14:
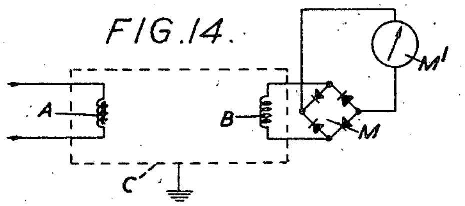
Figure 15:
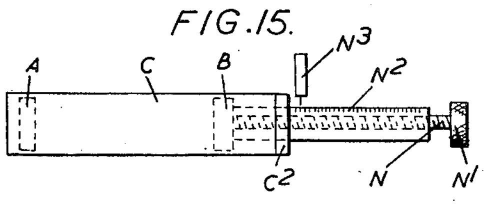
Figure 16:
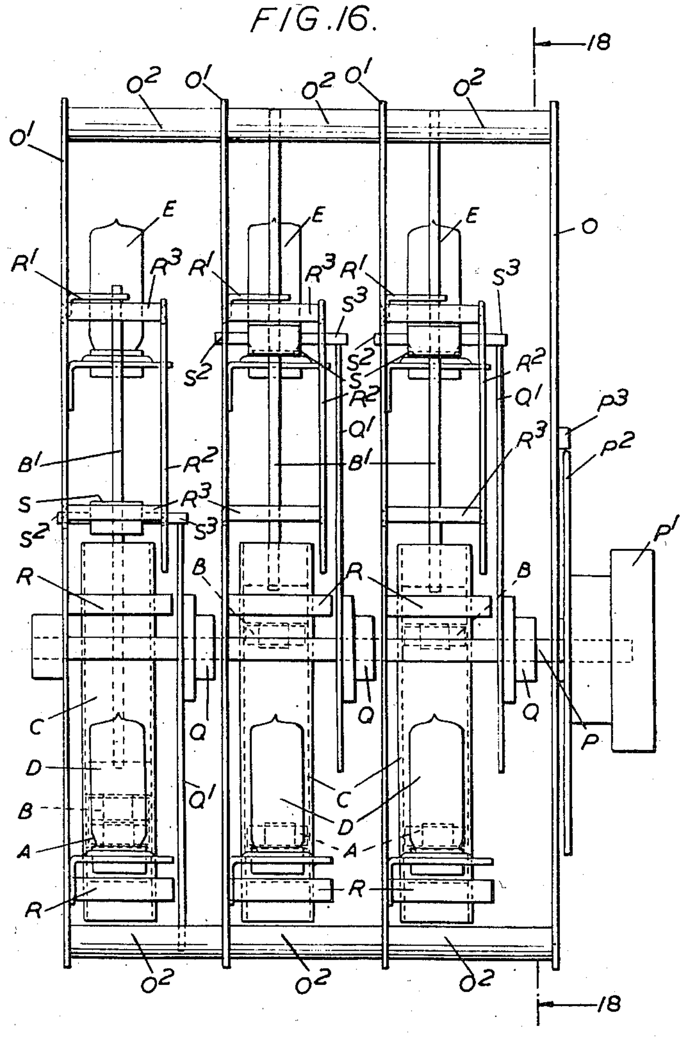
Figures 17, 18:
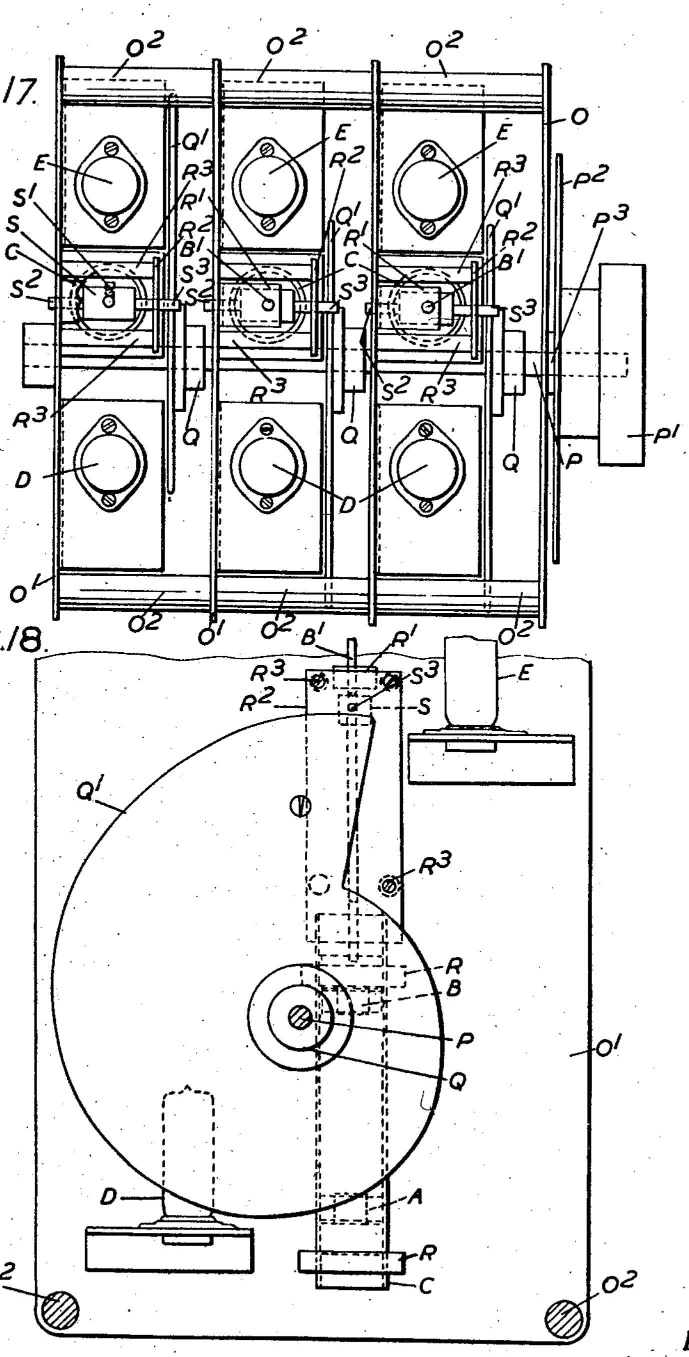

The invention may be carried into practice in various ways, but the accompanying drawings illustrate by way of example a preferred practical construction of low frequency variable attenuator according thereto, together with some modifications and also some alternative arrangements of audiometer and other apparatus incorporating such attenuator. In these drawings, Figure 1 is a longitudinal sectional view of the preferred construction of attenuator, Figure 2 is a transverse sectional view of a modified form of attenuator, Figure 3 is a circuit diagram of one audiometer arrangement, Figures 4 and 5 are circuit diagrams of two alternative audiometer arrangements, Figures 6 and 7 are two views at right angles illustrating a practical construction of parts of the audiometer shown in Figure 3 or Figure 4, Figures 8 and 9 similarly illustrate a modified construction, Figures 10 to 12 illustrate a further alternative audiometer arrangement, Figure 13 shows yet another practical construction, Figure 14 is a circuit diagram of an alternative use of the attenuator shown in Figure 1, Figure 15 illustrates a further alternative attenuator arrangement, and Figures 16 to 18 are respectively a side view, a plan view and a sectional view on the line 18—18 of Figure 16 of a convenient practical construction of multiple variable attenuator.

The preferred construction of attenuator shown in Figure 1, comprises an input coil A and an output coil B mounted coaxially with one another within a cylindrical screening tube C made of magnetic material. Although it is not essential to close the ends of the screening tube C, the example illustrated shows the tube closed at both ends, by means of discs $C^1$ and $C^2$ of the same magnetic material as the tube, the two coils A and B being supported by rods $A^1$ and $B^1$ which pass respectively through the two ends discs $C^1$ and $C^2$. At least one of these rods $A^1$ $B^1$, and preferably each of them, is mounted to slide in its supporting disc $C^1$ or $C^2$, so that the axial distance between the two coils A and B can be varied.

If with such an arrangement an alternating voltage is applied to the input coil A, a voltage is induced in the output coil B, owing to the mutual inductance between them, and it is found that such output voltage is a logarithmic function of the axial distance between the coils, provided that the distance is such as to give a coupling factor of less than about .2. This fact is very convenient, for, as the decibel is itself a logarithmic unit, it is practicable so to arrange the attenuator, that the attenuation measured in decibels varies with the coil spacing in accordance approximately with a linear law.

For this purpose, it is important to employ magnetic material for the screening tube C and to make the wall thickness of the tube greater than a predetermined minimum. It is unimportant by how much the wall thickness exceeds such minimum, and indeed the thickness need not be uniform provided that at no point is it less than the minimum. Thus in some instances it may be convenient to make the outside surface of the tube C of square or other cross-section (as indicated in Figure 2), whilst employing a circular cross-section for the inside surface of the tube. Soft iron and mild steel are suitable materials for the tube C, but if desired one of the high permeability materials such as mumetal may be used, the greater permeability permitting a smaller wall thickness to be used. Broadly speaking, the minimum wall thickness depends on the depth of penetration of the electro-magnetic field into the material of the tube, and in practice it is essential, as mentioned above, that the wall thickness should at no point be less than $3.5/\sqrt{\pi f \mu \sigma}$. Thus taking $f$ for example as 100 cycles per second, the minimum wall thickness works out at about .7 millimeter in the case of mumetal or 3.5 millimetres in the case of mild steel. A convenient practical thickness to use is about 1.5 millimetres for mumetal or 5 millimetres for mild steel.

It is also important that the internal diameter of the tube C should be considerably greater than the minimum wall thickness, preferably at least four times as great, and provided this condition is satisfied, the diameter can usually be chosen to suit practical convenience. It will seldom be required, however, for the internal diameter to be greater than about 35 millimetres. The dimensions will, however, depend on the material used for the tube. For, the attenuation per unit length of the tube is dependent on its effective internal diameter, such effective diameter however differing from the physical internal diameter of the tube to an extent dependent on the depth of penetration of the electro-magnetic field into the material of the tube. Since the depth of penetration is proportional to the product of $\mu\sigma$ and $f$, it will be clear that the effective diameter varies with change of frequency, the effective diameter decreasing as the frequency increases. In order to minimise the variation of attenuation with change of frequency, it is in general desirable to choose a material for the tube having a high $\mu\sigma$ value, so that the depth of penetration will be small in comparison with the physical internal diameter of the tube. Thus, it is preferable to choose material such that the product $\mu\sigma$ is greater than say 1000 and preferably greater than 2000, when $f$ is 100. It should, however, be mentioned that it is practicable to use a material with somewhat poorer magnetic properties (for example a mild steel having sufficient impurities to lower its $\mu\sigma$ value below such value) if the internal surface of the tube is interrupted by longitudinal grooves (as indicated in chain line at $C^3$ in Figure 2), having a depth up to say half the thickness of the tube wall. The effect of this is to increase the effective internal diameter of the tube somewhat, especially for the higher frequencies, thus preventing the falling away of attenuation at the higher frequencies and affording some compensation for the variation of effective diameter with change of frequency. It should be made clear that, since such grooving has negligible effect at the low frequencies which determine the minimum thickness of the tube wall, the grooves should be ignored when calculating the minimum wall thickness.

The input coil A is wound on a core of magnetic material, which need not be the same as the material of the tube and may consist of mild steel, and is designed to have as high a reactance as possible, consistant with a low ohmic resistance, and a self-capacity such that its resonant frequency is well above the highest frequency at which the attenuator is required to operate.

The output coil B is generally similar to the input coil A, but in this case the coil is wound on a core of non-magnetic insulating material. The relative numbers of turns of the two coils should be chosen to suit the purpose for which the attenuator is to be used.

The manner in which the coil or coils are moved, will depend on the particular use to which the attenuator is applied, and there are various low frequency uses for which it can usefully be employed. It is especially convenient for use in an audiometer wherein it can be employed to perform either or both of two important functions. One of such functions is to vary to an accurately measured extent, the intensity of the sound output of the audiometer derived from a constant amplitude electrical input thereto. The other function is to provide automatic compensation for the variable response of the transducer and of the normal human ear to different frequencies. One simple audiometer arrangement, wherein a single attenuator is used to perform both these functions is shown in Figures 3 to 6 and will now be described.

In this arrangement (see Figure 3) the audiometer comprises a variable frequency electronic oscillator for producing audio-frequency oscillations of substantially constant amplitude for all frequencies, the output from the oscillator being fed to the grid circuit of a driver valve D, whose cathode is connected to earth through the input coil A of the attenuator, the screening tube C of which is also earthed. The output coil B of the attenuator is connected in the grid circuit of an amplifying valve E, whose anode circuit contains the primary $E^1$ of a transformer, the secondary $E^2$ of which serves to energise an electro-acoustic transducer, conveniently in the form of a telephone F.

The oscillator may (as shown in Figure 3) be of the beat frequency type comprising two high frequency oscillation circuits G $G^1$, one of which G generates fixed frequency oscillations, whilst the other $G^1$ generates variable frequency oscillations, the frequency being controlled by a rotary condenser $G^2$, the outputs of the two circuits G $G^1$ being caused to beat with one another in a suitable mixing circuit (indicated at $G^3$) whose output is fed to the driver valve D.

Alternatively, the oscillator may be of the switched fixed frequency type, wherein the frequency of the oscillations is controlled by a rotary switch which acts to vary the inductance or capacitance or resistance in the tuning circuit of the oscillator. Two such arrangements are illustrated in Figures 4 and 5.

In the arrangement of Figure 4, the frequency of the oscillations generated by an oscillator valve H is determined by a circuit having inductance $H^1$ and capacitance $H^2$, one of the elements in this circuit (the capacitance in the example illustrated) being in the form of a number of different units, any one of which can be brought into circuit by means of a rotary switch $H^3$, so as to vary the oscillation frequency, the output of the valve H being fed to the driver valve D.

Figure 5 shows a resistance-capacitance oscillator circuit comprising a main oscillator valve J and an amplifying valve $J^1$, the oscillation frequency being controlled by a two-armed rotary switch $J^2$, one arm of which acts to bring into the grid circuit of the main valve J any one of a set of different resistances $J^3$, whilst the other arm simultaneously acts to bring into a feed-back circuit any one of a second set of different resistances $J^4$. The output of the amplifying valve $J^1$ is fed to the grid of the driver valve D.

With each of these arrangements the rotary controlling member (condenser $G^2$ or switch $H^3$ or $J^2$) is mounted (see Figure 6) on a spindle $K^1$ passing through a bearing bush $K^2$ on the panel of the audiometer for operation by a handknob K carrying a graduated dial member $K^3$ cooperating with a pointer mark on the front of the panel, the graduations indicating the frequency of the oscillations applied to the input coil A of the attenuator.

A second hand-knob L on the front end of a spindle $L^1$ passing through a bearing bush $L^2$ on the panel is provided with a dial member $L^3$ graduated in decibels, and controls the attenuator in such a way as to vary the intensity of the sound output of the transducer F to a measured extent, as indicated on the dial. For this purpose, the hand-knob L acts through suitable mechanism to drive the output coil B of the attenuator nearer to or further from the input coil A.

Figure 8:
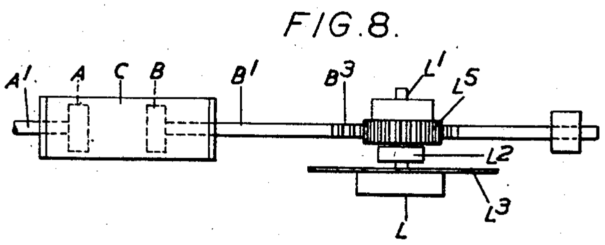

This mechanism may consist, as shown in Figures 6 and 7, of a cam $L^4$ on the spindle $L^1$ directly acting on the rod $B^1$ carrying the output coil B, a spring $B^2$ being provided to maintain the rod $B^1$ in contact with the cam $L^4$. Since the attenuator has a substantially linear law the cam $L^4$ may be replaced by a pinion $L^5$ engaging with a toothed rack $B^3$ provided on the rod $B^1$, as shown in Figures 8 and 9. In another alternative, showin in Figure 10 (which however illustrates an alternative audiometer arrangement), the control by the hand-knob L of the output coil B is effected through a flexible connection such as a Bowden cable $L^6$, the end of which is wrapped round and attached to a grooved pulley $L^7$ on the spindle $L^1$.

With the audiometer arrangement, as so far described, a difficulty arises in that, owing to the different response of the transducer F and also of the normal human ear to different frequencies, the scale of the attenuation hand-knob L would require a different zero point for each frequency. Whilst it is practicable to provide means for correcting this zero error for a series of specified frequencies, the attenuator above described makes it possible to give automatic zero correction for all frequencies.

This is effected by moving the input coil B of the attenuator in accordance with the frequency changes. For this purpose, the spindle $K^1$ of the frequency-control handknob K is provided with a cam $K^4$ which acts, directly or indirectly, on the supporting rod $A^1$ of the input coil A, and whose shape is chosen to suit the characteristics of the particular transducer in use. In the arrangement shown in Figures 6 and 7, the cam $K^4$ acts directly on the rod $A^1$, a spring $A^2$ being provided to maintain the rod in contact with the cam. Alternatively (as indicated in Figure 10), the cam $K^4$ may act on the rod $A^1$ through the medium of a Bowden cable $K^5$, the end of which is connected to a plunger $K^6$ sliding in a fixed barrel $K^7$ and held in engagement with the cam $K^4$ by means of a spring $K^8$.

In the arrangement shown in Figures 6 and 7, this cam $K^4$ is so shaped as to afford correction for the sum of the response errors of the transducer and of the normal ear for different frequencies, and it will be clear that the consequent movement of the input coil A has the effect of appropriately altering the zero point of the attenuation handknob L. It should be explained that (in the manner known in itself in audiometry) the zero point of the attenuation scale $L^3$ is calibrated to suit the threshold of hearing of the normal human ear, so that a pure tone at a given frequency becomes just audible to the normal ear when the attenuation scale indicates zero. The compensation afforded by the movement of the input coil A ensures that the same zero point of the scale $L^3$ corresponds to the threshold of hearing of the normal ear, not only for one given frequency but for all frequencies within the audible range. The test made is to determine to what extent the ear being tested differs from the standard normal ear, the reading of the attenuation scale $L^3$ giving the measure of such difference at each frequency.

In practice, it is usually desirable (as shown in Figures 10 to 12) to provide two alternative transducers F and $F^1$, one for use with hearing through the ear in the ordinary way and the other for use with hearing by bone conduction. Such transducers F and $F^1$ will have different characteristics, as the result of which the compensating movement of the input coil A required for one transducer F will differ from that required for the other transducer $F^1$. This can readily be catered for by so arranging the variable condenser $G^2$ or the rotary switch $H^3$ or $J^2$ controlling the frequency variation that it covers the complete range in 180 degrees of movement, and repeats the variation through the remaining 180 degrees. It is then possible to provide a double cam $K^9$ on the rotor spindle $K^1$, one half of which suits the compensation required for one transducer F, and the other half that for the other transducer $F^1$, the spindle K also carrying a further cam $K^{10}$ which controls a switch $F^2$ for transferring from one transducer to the other at the angular positions at which the two parts of the double cam $K^9$ join one another. Alternatively, two separate cams could be used, with means for changing over from one cam to the other, appropriately ganged with the switch control for changing over from one transducer to the other.

Figure 13 illustrates a preferred practical construction, in which the rods $A^1$ and $B^1$ for operating the two coils of the attenuator both pass through one end of the screening tube C. In the example illustrated, by way of variant, the tube C is left open at its ends, the tube being assumed to be made of a high permeability material, such as mumetal. The output coil B is made annular in form to permit the rod $A^1$ for operating the input coil A to pass through it. In other respects, the arrangement is generally similar to that of Figures 10 to 12, except that the rod $A^1$ is directly operated by the cam $K^9$, the tube C being mounted at an angle so that gravity will assist the return spring $K^8$ for keeping the cam follower on the rod $A^1$ in engagement with the cam $K^9$.

It will be appreciated that the foregoing description has been given by way of example only, and that the audiometer may be arranged in other ways within the scope of the invention.

The variable low frequency attenuator according to the invention, can however, also be used for purposes other than audiometry. In such cases, usually, the output coil of the attenuator will be arranged to energise some other form of output device appropriate to the purpose to which the attenuator is applied. For example, the output device may consist of an accurate measuring device.

Figure 14 shows one example of such use, wherein the attenuator is employed in a monitoring circuit, for measuring a variable sample of the input applied to the coil A of the attenuator. In this case, the output coil B is shown as connected through a bridge rectifier M to a measuring instrument $M^1$.

Figure 15 illustrates an alternative constructional form of attenuator according to the invention, which is suitable for use for a variety of purposes. In this example, the end disc $C^2$ firmly secured to the screening tube C is internally screwthreaded to receive a screwthreaded rod N whose inner end is coupled to the output coil B in such a manner that the coil will move axially with the rod but will not rotate therewith. The rod N is operated by a knurled hand-knob $N^1$, and for many uses it will be convenient to provide the rod with a micrometer head of any well-known type to give highly accurate measurement of the axial movement of the coil B. In the example illustrated, the coil B carries a scale $N^2$ which passes through a slot in the end disc $C^2$ and may constitute the means for holding the coil B against rotation, this scale cooperating with a fixed index $N^3$. In addition, the hand-knob $N^1$ may carry a dial (in the manner already described with reference to Figures 6 and 7) to give a further place or places of decimals in the reading of the scale $N^2$.

This construction may be employed for giving accurate and measured control of the variation in output of the attenuator, for example in audiometry to give accurate control of the decibel gain. Alternatively, when applied to the monitoring circuit of Figure 14, it can be used to give a null-balance method of measurement by taking the micrometer reading when the output coil B has been moved to the position in which the output measuring instrument $M^1$ shows a zero reading, thus enabling a cheap and simple form of output measuring instrument to be used. Other possible uses of this construction, with or without a measuring head on the rod N, will be readily apparent without further description.

Circumstances often arise in practice in which it is desirable to operate two or more variable attenuators simultaneously, and Figures 16 to 18 show a convenient practical construction of multiple variable attenuator for this purpose. The individual attenuator units, whose number depends upon the requirements of the particular case (three being shown by way of example in the drawings) are assembled one behind the other, behind a front panel O, on a supporting framework comprising a set of supporting plates $O^1$ suitably spaced from one another by distance pieces $O^2$ so as to provide a set of compartments one for each unit. A primary operating spindle P common to all the units passes through the framework from front to rear and is provided at its front end, projecting through the front panel O, with a control hand-knob $P^1$ carrying a dial $P^2$, which cooperates with an index $P^3$ on the front surface of the front panel. Although the individual units may have different operating characteristics and different adjustments, the arrangement of their parts is similar and a description of one of them will therefore suffice.

The primary spindle P has secured to it, for example by means of grub screws, a set of collars Q one for each unit, and each collar Q carries a cam $Q^1$, the cam being split into two parts or otherwise so formed that it can readily be detached from the collar and replaced by a differently shaped cam. The mounting is also such that each cam $Q^1$ can be fixed in any desired angular position in its own plane on the spindle.

The screening tube C of each attenuator unit is mounted vertically, to one side of the primary operating spindle P, by means of clamping brackets R extending forwardly from the supporting plate $O^1$ of the unit, and the output coil B of the unit is carried by a rod $B^1$ passing through a guide hole in a further bracket $R^1$, the arrangement being such as to ensure proper vertical movement of the coil without sideplay. A block S is adjustably secured to the rod $B^1$ by a grub screw $S^1$ and carries pegs $S^2$, $S^3$, one of which $S^2$ can slide in a vertical slot in the supporting plate $O^1$ whilst the other $S^3$ slides in a similar slot in a guide plate $R^2$ secured in front of the unit by brackets $R^3$ this peg $S^3$ protruding in front of the guide plate $R^2$ far enough to rest on the upper edge of the cam $Q^1$. It will thus be clear that rotation of the primary operating spindle P will cause the cams $Q^1$ to raise or lower the output coils B of all the attenuator units simultaneously, although the actual movements of the coils B in the various units may be different from one another depending on the shape and positioning of the individual cams.

Thus, if the output of each attenuator unit is plotted against the rotational movement of the primary operating spindle P, the shape of the curve will depend on the shape of the cam $Q^1$ (and can be varied independently of other units by the substitution of another cam of different shape) and the "phase" of the curve will depend upon the angular positioning of the cam on the spindle. The height of the curve above a zero or datum line will depend on the positional adjustment of the block S on the rod $B^1$, and this too can be varied independently of other units.

The input coil A of each attenuator unit may be fixed or alternatively may be axially adjustable independently of the other units. Thus, for example, if the multiple attenuator is employed in an audiometer circuit, the input coil A will be arranged to be moved axially for compensating purposes by the frequency control hand-knob of the input oscillator in the manner above described. For other uses, too, it may be convenient to provide for axial movement of the input coil A, for example by screw-thread control in the manner described with reference to Figure 15. It will be appreciated that axial adjustment of the input coil A, like the adjustment of the block S on the rod $B^1$ will have the effect of adjusting the height of the characteristic curve relatively to the datum line, but it may often be convenient to have two adjustments for this purpose. For example, the adjustment of the block S on the rod $B^1$, may if desired, be reserved wholly for the purpose of making the correct setting when substituting one cam for another, whilst adjustment of the input coil is used operationally, for example for compensation purposes as in audiometry. Again, in some instances, it might be desirable to link the controls of the input coils of all the units together so as to provide a simultaneous common control for all the units, whilst still permitting individual adjustment by movement of the block S.

The supporting plates $O^1$ are also used to support the driver valve D and the output amplifying valve E associated with each unit, since it is desirable to mount these valves as close as is practicable to the input and output coils A and B to which they are connected.

It will be appreciated that this construction of multiple attenuator affords a simple and reliable construction giving a wide range of continuous variability, with freedom from interfering noises (when the device is used for audiometry), the arrangement being very flexible in that it permits simultaneous operation of attenuator units with widely different characteristics. In particular, it will be noticed that in the example illustrated one of the units has its output coil near the bottom of its range of movement whilst in the others the coil near the top of its range. This is intended to indicate by way of example one very useful variant, in which the cam in one unit is mounted in the opposite sense to the cam in another unit so that whilst one unit gives a progressively increasing output that of the other is correspondingly decreasing.

It will be appreciated that the foregoing examples are illustrative of a wide range of possible alternative arrangements according to the invention.

What we claim as our invention and desire to secure by Letters Patent is:

1. A variable attenuator for low frequency electrical circuits, comprising in combination an input coil, an output coil mounted coaxially therewith, a cylindrical screening tube of magnetic material coaxially surrounding the two coils and having an internal cross-sectional area of which at least 90 percent is occupied by each of the coils, and means whereby the axial distance between the two coils can be varied, the wall thickness of the screening tube being greater than $3.5/\sqrt{\pi f \mu \sigma}$ in metres, where $f$ is the minimum frequency of the circuit in cycles per second, $\mu$ is the magnetic permeability of the material of the screening tube in henrys per metre at the frequency $f$, and $\sigma$ is the electrical conductivity of the material of the screening tube in mho's per cubic metre.

2. A variable attenuator as claimed in claim 1, in which the material of the screening tube is such that the product $\mu\sigma$ is not less than 1000, when $f$ is 100.

3 A variable attenuator as claimed in claim 2, in which the internal diameter of the screening tube is not less than four times the wall thickness of the tube.

4. A variable attenuator as claimed in claim 3, in which the input coil is wound on a core of magnetic material and has high reactance and low resistance and such self-capacitance that its resonant frequency lies well above the maximum frequency at which the attenuator is to be used, and the output coil is wound on a core of non-magnetic material.

5. A variable attenuator as claimed in claim 1, in which the internal diameter of the screening tube is not less than four times the wall thickness of the tube.

6. A variable attenuator as claimed in claim 1, in which the input coil is wound on a core of magnetic material and has high reactance and low resistance and such self-capacitance that its resonant frequency lies well above the maximum frequency at which the attenuator is to be used, and the output coil is wound on a core of non-magnetic material.

7. A variable attenuator for low frequency electrical circuits, comprising in combination an input coil, an output coil mounted coaxially therewith, a cylindrical screening tube of magnetic material coaxially surrounding the two coils and having an internal cross-sectional area of which at least 90 percent is occupied by each of the coils, a primary operating spindle, and an actuating device operated by the spindle for effecting axial movement of one of the two coils, the wall thickness of the screening tube being greater than $3.5/\sqrt{\pi f \mu \sigma}$ in metres, where $f$ is the minimum frequency of the circuit in cycles per second, $\mu$ is the magnetic permeability of the material of the screening tube in henrys per metre at the frequency $f$, and $\sigma$ is the electrical conductivity of the material of the screening tube in mho's per cubic metre.

8. A variable attenuator as claimed in claim 7, in which the actuating device comprises a cam operated by the primary spindle and whose shape determines the rate of change of attenuator output relatively to the operating spindle movement, a rod-like element carrying the attenuator coil to be moved, a member operated by the cam and adjustably mounted on the rod-like element, and means for adjusting such member along the rod-like element whereby the datum value of the attenuator output with respect to which the output variations produced by operation of the primary spindle take place can be adjusted.

9. A variable attenuator as claimed in claim 7, having means for adjusting the axial position of the other coil of the attenuator, whereby the datum value of the attenuator output with respect to which the output variations produced by operaion of the primary spindle take place can be adjusted.

10. A variable attenuator as claimed in claim 7, in which the material of the screening tube is such that the product $\mu\sigma$ is not less than 1000 when $f$ is 100, and the internal diameter of the tube is not less than four times the wall thickness of the tube.

11. A multiple variable attenuator for low frequency electrical circuits, including in combination a plurality of attenuator units each comprising an input coil, an output coil mounted coaxially therewith, and a cylindrical screening tube of magnetic material coaxially surrounding the two coils and having an internal cross-sectional area of which at least 90 percent is occupied by each of the coils, at least one of the two coils being movable axially along the tube, a single primary operating spindle common to the group of attenuator units, and a separate actuating device for each attenuator unit operated by the common spindle for varying the axial distance between the two coils of the associated unit, each actuating device serving to determine the relationship between the change of output of the associated attenuator unit and the movement of the common operating spindle, the wall thickness of the screening tube of each attenuator unit being greater than $3.5/\sqrt{\pi f \mu \sigma}$ in metres, where $f$ is the minimum frequency in cycles per second at which the attenuator unit is to be used, $\mu$ is the magnetic permeability of the material of the screening tube in henrys per metre at the frequency, $f$, and $\sigma$ is the electrical conductivity of the material of the screening tube in mho's per cubic metre.

12. A multiple variable attenuator as claimed in claim 11, in which each actuating device is adjustably and detachably mounted relatively to the common operating spindle, whereby the relationship between the change of output of any of the attenuator units and the movement of the common spindle can be varied by adjustment of or by replacement of the associated actuating device.

13. A multiple variable attenuator as claimed in claim 12, having means associated with each attenuator unit for adjusting the datum value of the output of the unit with respect to which the output variations produced by movement of the common operating spindle take place.

14. A multiple variable attenuator for low frequency electrical circuits, including in combination a plurality of attenuator units each comprising an input coil, an output coil mounted coaxially therewith, and a cylindrical screening tube of magnetic material coaxially surrounding the two coils and having an internal cross-sectional area of which at least 90 percent is occupied by each of the coils, at least one of the two coils being movable axially along the tube, a single primary operating spindle common to the group of attenuator units, means whereby operation of such spindle causes the axial distance between the two coils of each attenuator unit to be varied and thereby simultaneously changes the outputs of all the attenuator units of the group, and separate means associated with each individual attenuator unit for adjusting the datum value of the output of the unit with respect to which the output variations of the unit produced by operation of the common spindle take place, the wall thickness of the screening tube of each attenuator unit being greater than $3.5/\sqrt{\pi f \mu \sigma}$ in metres, where $f$ is the minimum frequency in cycles per second at which the attenuator unit is to be used, $\mu$ is the magnetic permeability of the material of the screening tube in henrys per metre at the frequency $f$, and $\sigma$ is the electrical conductivity of the material of the screening tube in mho's per cubic metre.

15. A multiple variable attenuator as claimed in claim 14, in which the operation of the common spindle causes axial movement of one coil of each attenuator unit, and the individual datum value adjustment of each attenuator unit is effected by axial adjustment of the other coil of the unit.

16. Low frequency electrical apparatus, including in combination a variable attenuator having a cylindrical screening tube of magnetic material and input and output coils coaxially mounted in such tube and each occupying at least 90 percent of the internal cross-sectional area of the tube, means for energising the input coil of the attenuator from a low frequency source, an output device, means for energising the output device from the output coil of the attenuator, and means whereby the axial distance between the two coils of the attenuator can be varied, the wall thickness of the screening tube being greater than $3.5/\sqrt{\pi f \mu \sigma}$ in metres, where $f$ is the minimum frequency of the circuit in cycles per second, $\mu$ is the magnetic permeability of the material of the screening tube in henrys per metre at the frequency $f$, and $\sigma$ is the electrical conductivity of the material of the screening tube in mho's per cubic metre.

17. Low frequency electrical apparatus as claimed in claim 16, in which the low frequency source comprises an electronic valve from whose output circuit the input coil of the attenuator is energised, and a low frequency oscillator from which such valve is fed.

18. Low frequency electrical apparatus as claimed in claim 16, in which the output device consists of an accurate measuring device.

19. Low frequency electrical apparatus as claimed in claim 18, in which the material of the screening tube is such that the product $\mu\sigma$ is not less than 1000 when $f$ is 100, and the internal diameter of the tube is not less than four times the wall thickness of the tube.

20. Low frequency electrical apparatus as claimed in claim 19, in which the low frequency source comprises an electronic valve from whose output circuit the input coil of the attenuator is energised, and a low frequency oscillator from which such valve is fed.

21. Low frequency electrical apparatus as claimed in claim 18, in which the input coil is wound on a core of magnetic material and has high reactance and low resistance and such self-capacitance that its resonant frequency lies well above the maximum frequency at which the attenuator is to be used, and the output coil is wound on a core of non-magnetic material.

22. An audiometer, including in combination a variable attenuator having a cylindrical screening tube of magnetic material and input and output coils coaxially mounted in such tube, a low frequency oscillator, means for controlling such oscillator whereby the frequency of its oscillations can be varied whilst maintaining the amplitude of the oscillations substantially constant throughout the frequency range, means for energising the input coil of the attenuator in accordance with the oscillations generated by the oscillator, an electro-acoustical transducer, means for energising such transducer from the output coil of the attenuator, and control means for the attenuator whereby the axial distance between its two coils can be varied, the wall thickness of the screening tube being greater than $3.5/\sqrt{\pi f \mu \sigma}$ in metres, where $f$ is the minimum frequency of the circuit in cycles per second, $\mu$ is the magnetic permeability of the material of the screening tube in henrys per metre at the frequency $f$, and $\sigma$ is the electrical conductivity of the material of the screening tube in mhos per cubic metre.

23. An audiometer as claimed in claim 22, including means for interlinking the control means for the oscillator and the control means for the attenuator whereby one of the coils of the attenuator is caused to move axially in accordance with the variation of the oscillator frequency.

24. An audiometer as claimed in claim 23, in which the control means for the attenuator also includes means for moving the other coil of the attenuator axially whereby the intensity of the sound output from the transducer can be varied.

25. An audiometer as claimed in claim 24, in which the interlinking means comprises a cam driven by the frequency control means for the oscillator, and means operated by the cam for effecting axial movement of the associated attenuator coil, the shape of the cam being such that the variation of attenuation caused by the coil movement affords compensation for the variable response to different frequencies of the transducer and of normal human hearing.

26. An audiometer, including in combination a variable attenuator having a cylindrical screening tube of magnetic material and input and output coils coaxially mounted in such tube, a low frequency oscillator, means for controlling such oscillator whereby the frequency of its oscillations can be varied whilst maintaining the amplitude of the oscillations substantially constant throughout the frequency range, means for energising the input coil of the attenuator in accordance with the oscillations generated by the oscillator, two electro-acoustical transducers having different characteristics for alternative use, means for energising either one of such transducers from the output coil of the attenuator, means for moving one of the attenuator coils axially for varying the intensity of the sound output from the operative transducer, a cam driven by the frequency-control means of the oscillator for moving the other attenuator coil axially, such cam having two parts respectively associated with the two transducers, and means for switching over from one transducer to the other when the cam control changes from one of its parts to the other, each part of the cam being so shaped that the variable attenuation caused by the coil movement affords compensation for the variable response to different frequencies of the associated transducer and of normal human hearing, the wall thickness of the screening tube being greater than $3.5/\sqrt{\pi f \mu \sigma}$ in metres, where $f$ is the minimum frequency of the circuit in cycles per second, $\mu$ is the magnetic permeability of the material of the screening tube in henrys per metre at the frequency $f$, and $\sigma$ is the electrical conductivity of the material of the screening tube in mhos per cubic metre.

References Cited in the file of this patent

UNITED STATES PATENTS

| | | |
|---|---|---|
| Re. 22,195 | Harnett | Oct. 6, 1942 |
| 1,625,723 | Hull et al. | Apr. 19, 1927 |
| 2,158,103 | Beyerle | May 16, 1939 |
| 2,204,179 | George | June 11, 1940 |
| 2,257,263 | Koren | Sept. 30, 1941 |
| 2,310,588 | Mages | Feb. 9, 1943 |
| 2,536,501 | Hood et al. | Aug. 30, 1946 |
| 2,597,090 | Freeman | May 20, 1952 |
| 2,684,462 | Tyzzer | July 20, 1954 |